(12) United States Patent
Chen

(10) Patent No.: US 11,062,126 B1
(45) Date of Patent: Jul. 13, 2021

(54) HUMAN FACE DETECTION METHOD

(71) Applicant: YUTOU TECHNOLOGY (HANGZHOU) CO., LTD., Hangzhou (CN)

(72) Inventor: Mingxiu Chen, Hangzhou (CN)

(73) Assignee: YUTOU TECHNOLOGY (HANGZHOU) CO., LTD., Zhejiang (CN)

( * ) Notice: Subject to any disclaimer, the term of this patent is extended or adjusted under 35 U.S.C. 154(b) by 566 days.

(21) Appl. No.: 15/999,651

(22) PCT Filed: Feb. 20, 2017

(86) PCT No.: PCT/CN2017/074061
§ 371 (c)(1),
(2) Date: Aug. 20, 2018

(87) PCT Pub. No.: WO2017/143952
PCT Pub. Date: Aug. 31, 2017

(30) Foreign Application Priority Data

Feb. 23, 2016 (CN) .......................... 201610099902.4

(51) Int. Cl.
*G06K 9/00* (2006.01)
*G06N 3/04* (2006.01)
(Continued)

(52) U.S. Cl.
CPC ..... *G06K 9/00281* (2013.01); *G06K 9/00248* (2013.01); *G06K 9/6256* (2013.01); *G06N 3/049* (2013.01); *G06N 3/08* (2013.01)

(58) Field of Classification Search
CPC ............. G06K 9/00281; G06K 9/6256; G06K 9/00248; G06N 3/08; G06N 3/049
(Continued)

(56) References Cited

U.S. PATENT DOCUMENTS 9,448,704 B1 * 9/2016 Belhumeur ........... G06F 3/0481
2001/0019620 A1    9/2001 Nagai et al.
(Continued)

FOREIGN PATENT DOCUMENTS

| CN | 101339607 | 1/2009 |
|----|-----------|--------|
| CN | 102663413 | 9/2012 |

(Continued)

OTHER PUBLICATIONS

PCT/CN2017/074061, Search Report and WrittenOpinion, dated May 24, 2017, 7 pages—Chinese, 9 pages—English.

*Primary Examiner* — Jerome Grant, II
(74) *Attorney, Agent, or Firm* — Andrew F. Young, Esq.; Nolte Lackenbach Siegel

(57) ABSTRACT

A human face detection method, falling within the technical field of image detection. The method comprises: respectively determining a plurality of pieces of human face characteristic information in a plurality of pre-input human face training samples, and training and forming a characteristic prediction model according to all the pieces of human face characteristic information in each of the human face training samples. The method further comprises: step S1, using an image acquisition apparatus to acquire an image; step S2, using a human face detector trained and formed in advance to determine whether the image comprises a human face, and if not, returning back to step S1; step S3, using a characteristic prediction model to obtain a plurality of pieces of human face characteristic information through prediction from the human face in the image; and step S4, constituting a facial structure associated with the human face according to the plurality of pieces of human face characteristic information obtained through prediction, and subsequently quitting. The beneficial effects of the technical solution are: being able to detect information about (Continued)

a human face comprising parts, such as the five sense organs and an outer profile, and improving the accuracy of human face detection.

8 Claims, 2 Drawing Sheets

(51) Int. Cl.
*G06N 3/08* (2006.01)
*G06K 9/62* (2006.01)

(58) Field of Classification Search
USPC .......................................................... 382/118
See application file for complete search history.

(56) References Cited

U.S. PATENT DOCUMENTS

| | | | |
|---|---|---|---|
| 2006/0120609 A1* | 6/2006 | Ivanov | G06K 9/6293 |
| | | | 382/224 |
| 2008/0037837 A1* | 2/2008 | Noguchi | G06K 9/00832 |
| | | | 382/118 |
| 2014/0147019 A1* | 5/2014 | Hanita | G06T 7/90 |
| | | | 382/117 |
| 2015/0098633 A1* | 4/2015 | Kato | G06K 9/00845 |
| | | | 382/118 |
| 2016/0055368 A1* | 2/2016 | Cao | G06K 9/6206 |
| | | | 382/195 |
| 2016/0253798 A1* | 9/2016 | Barrett | G06K 9/00281 |
| | | | 348/77 |
| 2017/0039761 A1* | 2/2017 | Zhang | G06T 17/00 |
| 2017/0083751 A1* | 3/2017 | Tuzel | G06K 9/00302 |
| 2019/0073259 A1* | 3/2019 | Qin | G06N 3/063 |
| 2019/0080154 A1* | 3/2019 | Xu | G06K 9/6274 |
| 2019/0122404 A1* | 4/2019 | Freeman | G06T 7/251 |
| 2019/0130167 A1* | 5/2019 | Ng | G06K 9/00268 |
| 2019/0130594 A1* | 5/2019 | Seyfi | G06K 9/00677 |
| 2019/0213474 A1* | 7/2019 | Lin | G06F 16/784 |
| 2019/0279009 A1* | 9/2019 | Srirangam Narashiman | |
| | | | G06T 7/248 |
| 2019/0332854 A1* | 10/2019 | Rezaeilouyeh | G06K 9/00281 |
| 2019/0370532 A1* | 12/2019 | Soni | G06N 3/08 |
| 2020/0125836 A1* | 4/2020 | Xu | G06N 3/0472 |
| 2020/0275151 A1* | 8/2020 | Xiong | H04N 21/4325 |
| 2020/0279156 A1* | 9/2020 | Cai | G06N 3/04 |

FOREIGN PATENT DOCUMENTS

| | | |
|---|---|---|
| CN | 103093237 | 5/2013 |
| CN | 104091149 | 10/2014 |

\* cited by examiner

HUMAN FACE DETECTION METHOD

CROSS-REFERENCE TO RELATED APPLICATIONS

The present application claims priority to and the benefit of Ser. No. PCT/CN2017/074061 filed Feb. 20, 2017, the entire contents of which are incorporated by reference, which in turn claims priority to and the benefit of Chinese Patent Application No. CN 201610099902.4 filed on Feb. 23, 2016, the entire content of which is incorporated herein by reference.

BACKGROUND OF THE INVENTION

1. Field of the Invention

The present invention relates to the technical field of image detection, especially to a method for human face detection.

2. Description of the Related Art

With the rapid development of technology of intelligent devices, various information interaction approaches are developed in intelligent devices, so as to enable a user to be liberated from traditional information input methods, such as inputting with a keyboard and a mouse. New information interaction approaches, such as voice interaction approach, gesture interaction approach, face recognition interaction approach and fingerprint identification interaction approach begin to be applied to the intelligent devices, such as an intelligent robot.

In existing techniques of face recognition interaction approach, the most important part is how to ensure the accuracy of face recognition. In other words, in order to ensure effectiveness of the face recognition interaction approach, the accuracy of face recognition must be ensured first.

For example, the face recognition interaction approach is utilized for AWU (Auto Wake Up) of the intelligent device, wherein if a face is recognized as a specific user, the intelligent device will be automatically waked up, if not, the intelligent device cannot be waked up. Under this circumstance, if the accuracy of face recognition is inadequate, following situation may occur: 1) the specific user cannot be recognized and the function of AWU will not be achieved, on the contrary, complexity of operation for the user will be increased; 2) misrecognition may occur, in other words, a face not corresponding to the specific user may be recognized as the face associated with the specific user, so that the function of AWU will be activated, thereby increasing potential possibility of privacy leak in the intelligent device.

The face recognition technology in prior art usually can only recognize a face facing towards a camera, if there is an angle between the face of a user and the camera, recognition accuracy will decrease drastically.

SUMMARY OF THE INVENTION

Aiming at the abovementioned technical problems, the invention provides a technical solution of a method for human face detection. The technical solution is intended to detect information on facial features including five sense organs and outer facial contour in a human face, so as to increase the accuracy of face detection.

The technical solution specifically comprises:
a method for human face detection comprises:
determining a plurality of pieces of face feature information respectively in a plurality of pre-input face training samples, and training to form a feature prediction model according to all the face feature information in each of the face training samples, wherein the method further comprises:

Step S1: an image capture device is used to capture images;

Step S2: a face detector formed in an advance training is used to determine whether any human face is included in the image;

if the result shows "NO", returning to Step S1;

Step S3: the feature prediction model is used to obtain a plurality of pieces of face feature information through prediction from the human face in the image; and Step S4: constituting a facial structure associated with the human face based on the plurality of pieces of face feature information obtained through prediction, then quitting.

Preferably, the method for human face detection, wherein steps of training to form the feature prediction model specifically comprises:

Step A1: a plurality of face images at various angles are obtained as the face training samples;

Step A2: on a preset face training sample, the plurality of pieces of face feature information are labeled as input information, and angle information associated with the preset face training sample is set as output information, so as to train the feature prediction model;

Step A3: determining whether there is any face training sample which is not as a basis of training yet:

if the result shows "YES", a final feature prediction model is formed and output, then quitting;

if the result shows "NO", returning to Step A2 to train the feature prediction model according to next face training sample.

Preferably, the method for human face detection, wherein in Step A2, a logical regression algorithm is used, with the plurality of pieces of face feature information being set as the input information, and the angle information as the output information, so as to train the feature prediction model.

Preferably, the method for human face detection, wherein in Step A2, a neural network regression algorithm is used, with the plurality of pieces of face feature information being set as the input information, and the angle information as the output information, so as to train the feature prediction model.

Preferably, the method for human face detection, wherein in Step A2, a method for obtaining the angle information associated with the face training sample, comprising:

obtaining corresponding angle information based on different angles between the obtained face images and the image capture device in advance.

Preferably, the method for human face detection, wherein in Step A2, a method for obtaining the angle information associated with the face training sample, comprising:

obtaining two arbitrary points on facial feature profile associated with the human face according to the face training sample, and determining the angle information associated with the face training sample according to an angle between a line joining the two arbitrary points and X-axis of the image coordinate; or obtaining two arbitrary points on facial feature profile associated with the human face according to the face training sample, and determining the angle information associated with the face training sample according to an angle between a line joining the two arbitrary points and Y-axis of the image coordinate.

Preferably, the method for human face detection, wherein each piece of the face feature information is used for representing one feature point in the human face.

Preferably, the method for human face detection, wherein the feature points comprises:

a feature point for representing eyebrows in the human face; and/or a feature point for representing eyes in the human face; and/or a feature point for representing a nose in the human face; and/or a feature point for representing a mouth in the human face; and/or a feature point for representing a whole outer facial contour in the human face.

Preferably, the method for human face detection, wherein in Step S2, if a human face is included in the image, location information and size information of the human face in the image will be obtained, then proceeding to Step S3;

and in Step S3, based on the location information and the size information of the human face, the feature prediction model is used to obtain a plurality of pieces of the face feature information from the human face in the image through prediction.

The advantageous effects of the invention includes: a method for human face detection is provided, and the method could detect information on facial features including five senses organs and outer facial contour in a human face, so as to increase the accuracy of face detection.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION

Figure 1:
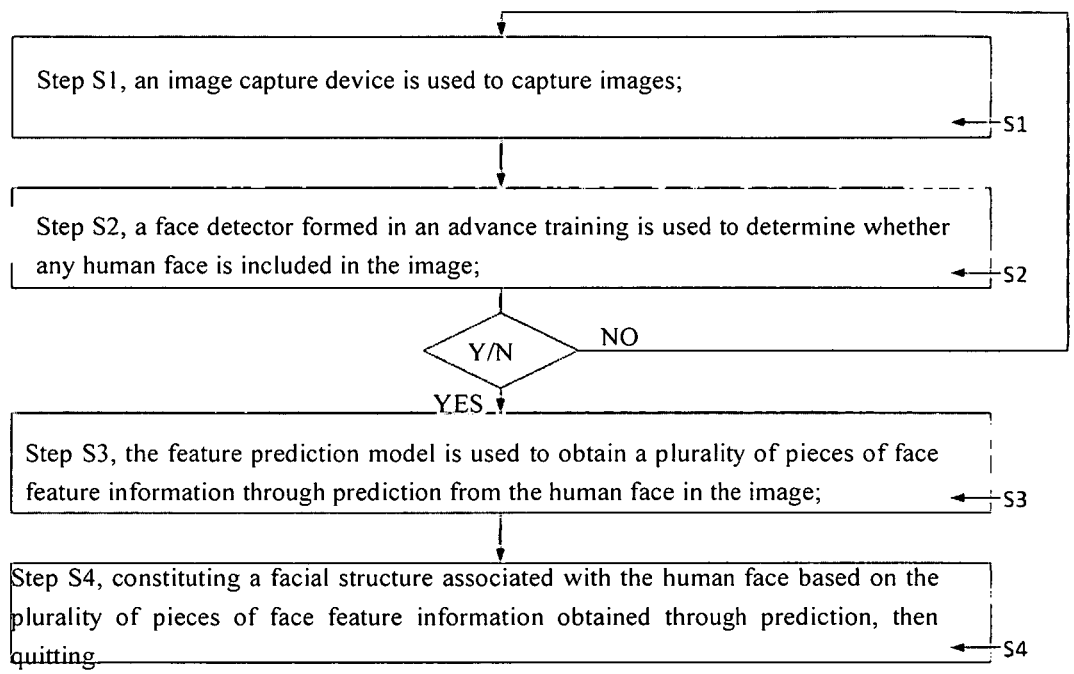
FIG. 1 is a general flow diagram of a method for human face detection according to a preferred embodiment of the invention.

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

In a preferred embodiment of the invention, aiming at solving the abovementioned technical problems in the prior art, a method for human face detection is provided, and the method can be applied to intelligent devices, especially those capable of performing information interaction with a user, such as an intelligent robot. Specifically, applying the method for human face detection to the intelligent robot, and the intelligent robot could execute corresponding operation by detecting the face of a user. For instance, if the face of a specific user is detected, the intelligent robot will be waked up and ready for receiving further instructions from the user.

The specific steps of the method for human face detection are shown in FIG. 1, comprising:

Step S1: an image capture device is used to capture images;

Step S2: a ace detector forms in an advance training is used to determine whether a human face is included in the image;

if the result shows "NO", returning to Step S1;

Step S3: the feature prediction model is used to obtain a plurality of pieces of face feature information through prediction from the human face in the image; and Step S4: constituting a facial structure associated with the human face based on the plurality of pieces of face feature information obtained through prediction, then quitting.

In a specific embodiment, firstly, the image capture device is used to capture images right in front of the image capture device. The image capture device could be a camera, such as a camera configured on the head of the intelligent robot.

In this embodiment, after images being captured by the image capture device, a face detector formed in an advance training is used to determine whether any human face is included in the image: if the result shows "YES", proceeding to Step S3; if the result shows "NO", returning to Step S1. Specifically, the face detector is a detection model, which could be formed in an advance training and be used to recognize a human face. In prior art, there are many technical solutions for training the detection model, thus, it is not necessary to give details herein.

In this embodiment, after a human face in the image being detected, the feature prediction model formed in an advance training is used to obtain the plurality of pieces of face feature information through prediction from the human face in the image. Specifically, the feature prediction model is formed by steps as follows: determining the plurality of pieces of face feature information respectively within pre-input multiple face training samples, and training to form the feature prediction model according to all the face feature information in each of the face training samples. Specific steps of forming the feature prediction model would be described in detail hereinafter.

In this embodiment, the face feature information could be used to represent feature information in various parts of the face, for example, including at least one of the followings:

a feature point for representing eyebrows in the human face; and/or a feature point for representing eyes in the human face; and/or a feature point for representing a nose in the human face; and/or a feature point for representing a mouth in the human face; and/or a feature point for representing a whole outer facial contour in the human face.

In other words, the face feature information is used for describing information of profile of various parts in the face. Thus, in the embodiment, after the face feature information is obtained through prediction by the feature prediction model formed in an advance training, facial characteristics of the face is obtained by the obtained face feature information, so that the whole facial structure of the face is obtained, thus, accuracy of face detection can be increased significantly.

In a preferred embodiment, in Step S2, if it is determined that a human face is included in the image, location information and size information of the human face in the image will be obtained, then proceeding to Step S3;

specifically, the location information refers to the location of a face in the whole image; the size information refers to the size of the face in the whole image, which could be measured by pixels.

Then in Step S3, based on the location information and the size information of the human face, the feature prediction model is used to obtain the plurality of pieces of the face feature information through prediction from the human face in the image.

Figure 2:
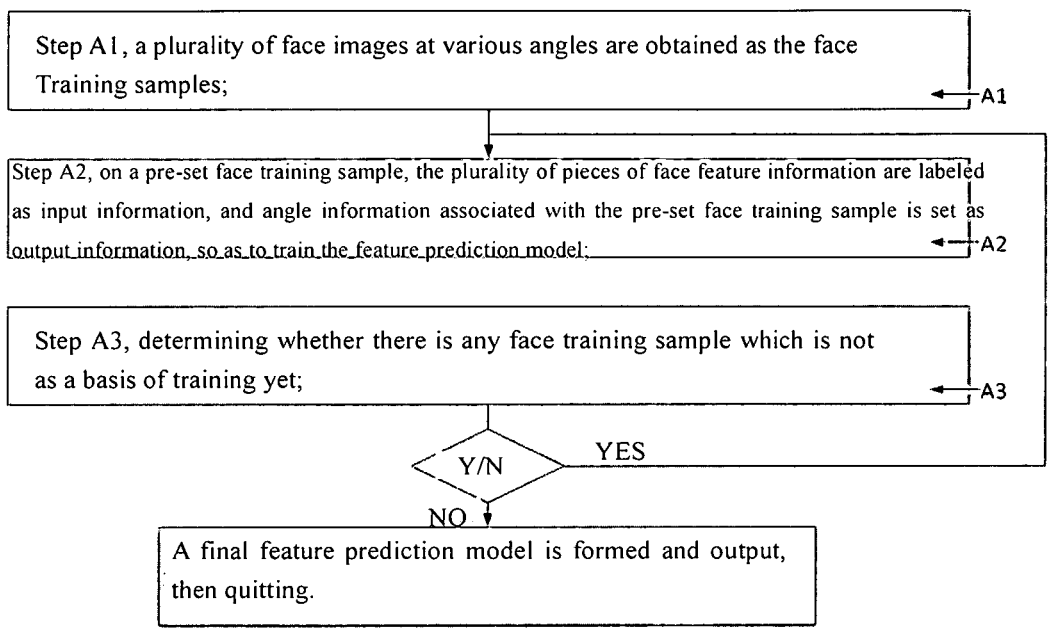
FIG. 2 is a flow diagram of feature prediction model formed in an advance training according to a preferred embodiment of the invention.

In a preferred embodiment of the present invention, as shown in FIG. 2, steps of training to form the feature prediction model specifically comprise:

Step A1: a plurality of face images at various angles are obtained as the face training samples;

Step A2: on a pre-set face training sample, the plurality of pieces of face feature information are labeled as input information, and angle information associated with the pre-set face training sample is set as output information, to train the feature prediction model;

Step A3: estimating whether there is any face training sample which is not as a basis of training yet:

if the result shows "YES", the final feature prediction model is formed and output, then quitting;

if the result shows "NO", returning to Step A2 to train the feature prediction model according to a next face training sample.

In a preferred embodiment of the present invention, the plurality of face training samples could be 100 face training samples, in other words, arranging for 100 average persons to stand in front of the image capture device for inputting corresponding faces as the face training samples.

Specifically, the face detection methods in prior art usually require a user to stand in the place just in front of the camera and the face must be facing towards the camera, in order to ensure the accuracy of face detection. If there is a specific angle between the face of the user and the camera, accuracy of face detection will be directly affected. Moreover, in a preferred embodiment, for solving this problem, the abovementioned feature prediction model is formed in an advance training, in other words:

firstly, a plurality of face images at various angles are obtained as the face training samples; with respect to each of the face training samples, an angle information of the face training sample relative to the camera should be obtained. The method for obtaining the angle information may comprise:

(1) the angle information is pre-obtained based on the angle between the face and the camera; for example, a user is arranged to stand in a position in a known angle relative to the camera in advance, so that the camera would capture a face image, then the known angle would be recorded as the angle information corresponding to the face training sample; or (2) obtaining two arbitrary points on the facial feature profile associated with the human face according to the face training sample, and determining the angle information associated with the face training sample according to an angle between a line joining the two arbitrary points and X-axis of the image coordinate; or (3) obtaining two arbitrary points on the facial feature profile associated with the human face according to the face training sample, and determining the angle information associated with the face training sample according to an angle between a line joining the two arbitrary points and Y-axis of the image coordinate.

In other words, the method for obtaining the angle information may comprise getting the pre-set angle information directly, or getting the angle information according to an angle between a line joining two arbitrary points on facial feature profile associated with the human face and X/Y-axis of the image coordinate.

In a preferred embodiment of the present invention, in Step A2, a plurality of pieces of face feature information are labeled as input information on a pre-set face training sample. Specifically, 68 feature points may be labeled on a pre-set face training sample as the face feature information according to preset criteria. As described above, the 68 pieces of the face feature information could be used to represent characteristic of a mouth, eyes, eyebrows, a nose, a facial contour and so on in the human face respectively, that is to say, the 68 pieces of the face feature information may be used to substantially describe the whole facial profile, including profile of various parts in the face. In other embodiments of the present invention, according to practical requirements for recognition accuracy, labels of the face feature information could be increased or decreased.

In a preferred embodiment of the present invention, with respect to a pre-set face training sample, a plurality of pieces of face feature information (e.g. 68 pieces of the face feature information) associated with the face training sample are set as input information, and angle information between the face in the face training sample and the camera is set as output information, so that the feature prediction model is trained.

Specifically, in a preferred embodiment of the present invention, the process of training to form the feature prediction model could be achieved by a logical regression algorithm, wherein the face feature information are set as the input information and input into a logical regression model trainer, and the corresponding angle information is set as the output information, so that the corresponding feature prediction model is obtained by using the logical regression algorithm.

In another preferred embodiment of the present invention, the process of training to form the feature prediction model could also be achieved by a neural network regression algorithm, wherein the face feature information are set as the input information, and the angle information is set as the output information, so that the feature prediction model is obtained through training.

In other embodiments of the present invention, the process of training to form the feature prediction model could further be achieved by other parameter regression algorithms, and it is not given unnecessary details herein.

In a preferred embodiment of the present invention, a final feature prediction model formed through training may be a SVM (Support Vector Machine) model. In practical applications, in Step S3, firstly, the feature prediction model is used to predict the plurality of pieces of face feature information through prediction from the human face in the image, such as 68 pieces of the face feature information obtained through prediction. Subsequently, a feature location information (a figure showing mutual location relationship) constituted by 68 pieces of the face feature information is input into the feature prediction model (SVM model), so as to get an angle information of the face, thereby obtaining relevant information on a facial structure associated with the human face at last.

In conclusion, the technical solution of the present invention provides a method for human face detection, wherein a feature prediction model, which is formed in an advance training, is utilized to obtain a plurality of pieces of face feature information through prediction in a human face according to various angles between the human face and an image capture device, so as to form a general facial structure of the human face, thereby increasing the accuracy of face detection.

These embodiments shown above represent only preferred examples of the present invention and may therefore not be understood to be limiting of the embodiments and scope of the invention. Alternative embodiments that can be contemplated by the person skilled in the art are likewise included in the scope of the present invention.

What is claimed is:

1. A method for human face detection, comprising: determining a plurality of pieces of face feature information respectively in a plurality of pre-input face training samples, and training to form a feature prediction model according to all the face feature information in each of the face training samples, wherein the method further comprises:
   Step S1: an image capture device is used to capture images;
   Step S2: a face detector formed in an advance training is used to determine whether a human face is included in the image;
      if not, returning to Step S1;
   Step S3: the feature prediction model is used to obtain a plurality of pieces of face feature information through prediction from the human face in the image; and
   Step S4: constituting a facial structure associated with the human face based on the plurality of pieces of face feature information obtained through prediction, then quitting;
   wherein steps of training to form the feature prediction model specifically comprises:
   Step A1: a plurality of face images at various angles are obtained as the face training samples;
   Step A2: on a preset face training sample, the plurality of pieces of face feature information are labeled as input information, and angle information associated with the preset face training sample is set as output information, to train the feature prediction model;
   Step A3: determining whether there is any face training sample which is not as a basis of training yet:
      if the result shows "YES", the final feature prediction model is formed and output, then quitting;
      if the result shows "NO", returning to Step A2 to train the feature prediction model according to a next face training sample.

2. The method for human face detection as claimed in claim 1, wherein in Step A2, a logical regression algorithm is used, with the plurality of pieces of face feature information being set as the input information, and the angle information as the output information, so as to train the feature prediction model.

3. The method for human face detection as claimed in claim 1, wherein in Step A2, a neural network regression algorithm is used, with the plurality of pieces of face feature information being set as the input information, and the angle information as the output information, so as to train the feature prediction model.

4. The method for human face detection as claimed in claim 1, wherein in Step A2, a method for obtaining the angle information associated with the face training sample, comprising:
   obtaining corresponding angle information based on different angles between the obtained face image and the image capture device in advance.

5. The method for human face detection as claimed in claim 1, wherein in Step A2, a method for obtaining the angle information associated with the face training sample, comprising:
   obtaining two arbitrary points on facial feature profile associated with the human face according to the face training sample, and determining the angle information associated with the face training sample according to an angle between a line joining the two arbitrary points and X-axis of the image coordinate; or
   obtaining two arbitrary points on facial feature profile associated with the human face according to the face training sample, and determining the angle information associated with the face training sample according to an angle between a line joining the two arbitrary points and Y-axis of the image coordinate.

6. The method for human face detection as claimed in claim 1, wherein each piece of the face feature information is used for representing one feature point in the human face.

7. The method for human face detection as claimed in claim 6, wherein the feature points comprise:
   a feature point for representing eyebrows in the human face; and/or
   a feature point for representing eyes in the human face; and/or
   a feature point for representing a nose in the human face; and/or
   a feature point for representing a mouth in the human face; and/or
   a feature point for representing a whole outer facial contour in the human face.

8. The method for human face detection as claimed in claim 1, wherein in Step S2, if it is determined that a human face is included in the image, location information and size information of the human face in the image will be obtained, then proceeding to Step S3;

and in Step S3, based on the location information and the size information of the human face, the feature prediction model is used to obtain a plurality of pieces of the face feature information through prediction from the human face in the image.

* * * * *